United States Patent Office 2,863,901
Patented Dec. 9, 1958

2,863,901

BASIC ESTERS OF DIALKYLTHIOLO PHOSPHONIC ACID

Ranajit Ghosh, Blackley, Manchester, England, assignor to Imperial Chemical Industries Limited, a corporation of Great Britain No Drawing. Application November 9, 1953
Serial No. 391,121

Claims priority, application Great Britain November 19, 1952

11 Claims. (Cl. 260—461)

This invention relates to new basic esters and to their manufacture.

More particularly it relates to new basic esters of thiophosphoric acid of the following general formula, viz:

$$O=P(OR_1)(OR_2)-S-LX$$

in which $R_1$ and $R_2$ stand for like or unlike alkyl radicals, L stands for a saturated straight- or branched-chain aliphatic hydrocarbon radical or for such a radical in which the carbon atoms are interrupted by an oxygen or sulphur atom, or by a nitrogen atom carrying an alkyl substituent and X stands for a secondary aliphatic or heterocyclic amine attached to L through the amino nitrogen atom.

Preferred esters are those which do not anywhere contain a hydrocarbon radical having more than 4 carbon atoms.

These new esters may be made by heating a halide of a thiophosphoric acid of the general formula $$S=P(OR_1)(OR_2)-Y$$

in which Y stands for a halogen atom and $R_1$ and $R_2$ for the same as above, either with an aminoalcohol of the general formula $$HOLX$$

where L and X stand for the same as above, in the presence of an acid absorbing agent, or with an alkali or other metal derivative of the general formula $$MOLX$$

in which M stands for a metal and L and X for the same as above.

The esters may also be made by heating a metal salt of a thiophosphoric acid of the general formula $$S=P(OR_1)(OR_2)-OMe$$

in which $R_1$, $R_2$ and M stand for the same as above with an aminoalkylhalide of the general formula $$YLX$$

where Y, L and X stand for the same as above.

Particularly preferred esters have the following general formula, viz:

$$O=P(OAlk)(OAlk)-S-alkylene-N(Alk)_2$$

in which Alk. stands for methyl and ethyl and alkylene has not more than 3 carbon atoms.

The new esters have outstanding pesticidal properties. Pesticidal compositions containing the esters described herein are disclosed and claimed in copending application, Serial No. 481,032, filed January 10, 1955.

The following examples in which parts are by weight illustrate but do not limit the invention.

*Example 1*

35.1 parts of β-diethylaminoethanol, 4.6 parts of sodium and 350.0 parts of benzene are stirred and heated under reflux until all the sodium has dissolved. After cooling, 37.7 parts of diethylchlorothionophosphonate are added and the mixture is heated under reflux for four hours. After removal of the sodium chloride by filtration, the reaction mixture is distilled to give O:O'-diethyl-S-(β-diethylamino)ethyl phosphorothiolate as a colourless oil, B. P. 97°/0.2 mm., $n_D^{21}$ 1.4732, of formula $$OP(OC_2H_5)_2SCH_2.CH_2.N(C_2H_5)_2$$

*Example 2*

A mixture of 18.85 parts of diethylchlorothionophosphonate, 11.7 parts of β-diethylaminoethanol, 10.6 parts of anhydrous sodium carbonate, 0.2 parts of copper bronze powder and 300 parts of xylene is heated at 90° C. for 5 hours. The mixture is filtered and the filtrate treated as in Example 1. The same product is obtained.

*Example 3*

This is similar to Example 1, but instead of β-diethylaminoethanol there is used β-dimethylaminoethanol. A corresponding product is obtained namely O:O'-diethyl-S-(β-dimethylamino)ethyl phosphorothiolate. This is a colourless oil, B. P. 70° C./0.225 mm., $n_D^{21}$ 1.4680.

*Example 4*

As Example 1, but using 1-diethylaminopropan-2-ol, O:O'-diethyl S-(1-diethylamino)prop-2-yl phosphorothiolate is obtained as a colourless oil, B. P. 94° C./0.081 mm., $n_D^{19}$ 1.4725.

*Example 5*

As Example 1, but using γ-diethylaminopropanol, O:O'-diethyl S-(γ-diethylamino)propyl phosphorothiolate is obtained as a colourless oil, B. P. 85° C./0.005 mm., $n_D^{21}$ 1.4686.

*Example 6*

As Example 1, but using 2-(1'-piperidyl)ethanol, O:O'-diethyl S-2-(1'-piperidyl)ethyl phosphorothiolate is obtained as a colourless oil, B. P. 110° C./0.012 mm., $n_D^{21}$ 1.4941.

*Example 7*

As Example 1, but using β-(N)morpholinoethanol, O:O'-diethyl S-(β-(N)morpholino)ethyl phosphorothiolate is obtained as a colourless oil B. P. 108° C./0.01 mm., $n_D^{21}$ 1.4875.

*Example 8*

As Example 1, but using 1-diethylamino-3-ethyl-mercaptopropan-2-ol, O:O'-diethyl S-(1-diethylamino-3-ethyl-mercapto)prop-2-yl phosphorothiolate is obtained as a colourless oil, B. P. 121–2° C./0.005 mm., $n_D^{25}$ 1.4949.

*Example 9*

As Example 1, but using 1:3-bis-diethylaminopropan-2-ol, O:O'-diethyl S-(1:3-bis-diethylamino) prop-2-yl phosphorothiolate is obtained as an oil, B. P. 102–4° C./0.0066 mm., $n_D^{21}$ 1.4760.

*Example 10*

As Example 1, but using 1-diethylamino-3-methoxy-propan-2-ol, O:O'-diethyl S-(1-diethylamino-3-methoxy) prop-2-yl phosphorothiolate is obtained as an oil, B. P. 98° C./0.0044 mm., $n_D^{24}$ 1.4748.

*Example 11*

This is similar to Example 1 except that methyl-ethyl-chlorothionophosphonate is used instead of the corresponding diethyl derivative.

O-ethyl O'-methyl S-(β-diethylamino)ethyl phosphorothiolate is obtained as a colourless oil, B. P. 79° C./0.065 mm., $n_D^{27}$ 1.4721.

Example 12

This is similar to Example 1, except that γ-di-n-butylaminopropanol is used instead of β-diethylaminoethanol O:O'-diethyl S-(γ-di(n)butylamino)propyl phosphorothiolate is obtained as an oil, B. P. 114° C./0.0066 mm., $n_D^{22}$ 1.4694.

Example 13

As Example 1, but using β-di-n-butylaminoethanol, O:O'-diethyl S-(β-di-(n)butylamino)ethyl phosphorothiolate is obtained as an oil, B. P. 112° C./0.013 mm., $n_D^{21}$ 1.4709.

Example 14

19.2 parts of sodium O:O'-diethyl phosphorothiolate are suspended in 264 parts of benzene and treated with 13.6 parts of β-diethylaminoethyl chloride and stirred and refluxed for 6½ hours in an atmosphere of nitrogen. The product is isolated as in Example 1.

It is O:O'-diethyl S-(β-diethylamino)ethyl phosphorothiolate.

Example 15

A solution of sodium O:O'-diethyl phosphorothiolate which is prepared from 79 parts of diethyl phosphite, 11.5 parts of sodium, 316 parts of ethanol and 16 parts of sulphur, is treated with 65.75 parts of β-diethylaminoethyl chloride and then stirred and refluxed in an atmosphere of nitrogen for 7 hours. The mixture is then filtered and the filtrate concentrated. The residue is taken up in ether and the ethereal solution washed with water and dried over anhydrous sodium sulphate. After removal of ether the residue is distilled under reduced pressure and the product collected. It is O:O'-diethyl S-(β-diethylamino)ethyl phosphorothiolate.

Example 16

4.6 parts of sodium are dissolved in a mixture of 35.1 parts of β-diethylaminoethanol and 264 parts of benzene, and then cooled to 10–15° C. in an atmosphere of nitrogen and 37.7 parts of diethylchlorothionophosphonate added cautiously with stirring so that the temperature is maintained as above. The whole mixture is then stirred for 3–3¼ hours at the room temperature (20–25° C.), and during this and subsequent operations an atmosphere of nitrogen is maintained in the apparatus. The mixture is then washed twice with water and the benzene solution dried over anhydrous sodium sulphate and concentrated under reduced pressure at or below 41° C., and O:O'-diethyl O''-(β)-diethylaminoethyl thionophosphate is obtained as an oil, $n_D^{24}$ 1.4664. On distillation in vacuo of the above oil a colourless liquid, B. P. 80–83° C./0.007 mm., $n_D^{24}$ 1.4669, is obtained.

Example 17

4.6 parts of sodium are dissolved in a mixture of 39.3 parts of 1-diethylaminopropan-2-ol and 264 parts of benzene, and then cooled to 10–15° C. in an atmosphere of nitrogen and 37.7 parts of diethylchlorothionophosphonate added cautiously with stirring so that the temperature is maintained as above. The whole mixture is then stirred for 3½ hours at the room temperature (20–25° C.) and during this and subsequent operations an atmosphere of nitrogen is maintained in the apparatus. The mixture is then washed with water and the benzene solution dried over anhydrous sodium sulphate and concentrated under reduced pressure at or below 40° C.

O:O'-diethyl O''-(1-diethylamino)prop-2-yl thionophosphate is obtained as an oil.

Example 18

4.6 parts of sodium are dissolved in a mixture of 43.5 parts of 2-di-(n)-propylaminoethanol and 264 parts of benzene, and then cooled to 10–15° C. in an atmosphere of nitrogen and 37.7 parts of diethylchlorothionophosphonate added cautiously with stirring so that the temperature is maintained as above. The whole mixture is then stirred for 3½ hours at the room temperature (20–25° C.) and during this and subsequent operations an atmosphere of nitrogen is maintained in the apparatus. The mixture is then washed with water and the benzene solution dried over anhydrous sodium sulphate and concentrated under reduced pressure at or below 40° C.

O:O'-diethyl O''-(β-di-(n)-propylamino)ethyl thionophosphate is obtained as an oil.

What I claim is:

1. Basic esters of phosphorothiolic acid of the general formula

O=P(O-alkyl)(O-alkyl)-S-alkylene-N(alkyl)(alkyl)

in which no alkyl has more than 2 carbon atoms and alkylene has not more than 3 carbon atoms.

2. Basic esters of phosphorothiolic acid of the general formula $O=P(OR_1)(OR_2)-S-LX$ in which $R_1$ and $R_2$ stand for lower alkyl radicals, L stands for a member of the group consisting of divalent saturated aliphatic hydrocarbon radicals of up to 6 carbon atoms and divalent saturated aliphatic hydrocarbon radicals of up to 6 carbon atoms in which the carbon atoms are interrupted by a linkage selected from the group consisting of an oxygen atom, a sulphur atom and a nitrogen atom carrying a lower alkyl substituent, and X stands for a member of the group consisting of secondary aliphatic amines, piperidine and morpholine attached to L through the amino nitrogen atom.

3. Esters as claimed in claim 2 which do not anywhere contain a hydrocarbon radical having more than 4 carbon atoms.

4. $O=P(OC_2H_5)(OC_2H_5)-S-CH_2.CH_2.N(C_2H_5)_2$.

5. Process for the manufacture of O:O-diethyl S-β-diethylaminoethyl phosphorothiolate which comprises heating diethylchlorothionophosphonate with the sodium derivative of β-diethylaminoethanol.

6. Process for the manufacture of O:O-diethyl S-β-diethylaminoethyl phosphorothiolate which comprises dissolving β-diethylaminoethanol and sodium in benzene and heating with diethylchlorothionophosphonate.

7. Process for the manufacture of O:O-diethyl S-β-diethylaminoethyl phosphorothiolate which comprises heating diethylchlorothionophosphonate and β-diethylaminoethanol in the presence of an acid absorbing agent.

8. Process for the manufacture of O:O-diethyl S-β-diethylaminoethyl phosphorothiolate which comprises heating diethylchlorothionophosphonate and β-diethylaminoethanol in xylene in the presence of anhydrous sodium carbonate and copper bronze powder.

9. Process for the production of the esters claimed in claim 2 which comprises heating a halide of a thiophosphoric acid of the general formula $S=P(OR_1)(OR_2)-Y$ in which Y stands for a halogen atom and $R_1$ and $R_2$ stand for lower alkyl radicals with an amino compound of the general formula

ZOLX where Z stands for a member of the group consisting of hydrogen and a metal, L stands for a member of the group consisting of saturated aliphatic hydrocarbon radicals containing up to 6 carbon atoms and saturated aliphatic hydrocarbon radicals containing up to 6 carbon atoms in which the carbon atoms are interrupted by a linkage selected from the group consisting of an oxygen atom, a sulphur atom and a nitrogen atom carrying a lower alkyl substituent and X stands for a member of the group consisting of secondary aliphatic amines, piperidine and morpholine attached to L through the amino nitrogen atom, the reaction being carried out in the presence of an acid absorbing agent when Z is hydrogen.

10. Process for the production of the esters claimed in claim 2 which comprises heating a metal salt of a thiophosphoric acid of the general formula $$S=P(OR_1)(OR_2)-OMe$$

in which $R_1$, $R_2$ stand for lower alkyl radicals and Me stands for a metal with an aminoalkylhalide of the general formula $$YLX$$

in which Y stands for a halogen atom, L stands for a member of the group consisting of saturated aliphatic hydrocarbon radicals containing up to 6 carbon atoms and saturated aliphatic hydrocarbon radicals containing up to 6 carbon atoms in which the carbon atoms are interrupted by a linkage selected from the group consisting of an oxygen atom, a sulphur atom and a nitrogen atom carrying a lower alkyl substituent and X stands for a member of the group consisting of secondary aliphatic amines, piperidine and morpholine attached to L through the amino nitrogen atom.

11. Process for producing an ester as claimed in claim 2 which comprises interacting (1) a compound of the formula:

$$S=P(OR_1)(OR_2)-Q$$

wherein $R_1$ and $R_2$ stand for lower alkyl radicals and Q stands for a member of the group consisting of halogen and OM with M being a metal, with (2) an amino compound of the formula $$Q_1LX$$

wherein when Q stands for halogen, $Q_1$ represents a member of the group consisting of HO— and MO— with M being a metal and, when Q stands for OM, $Q_1$ represents a halogen atom, L stands for a member of the group consisting of saturated aliphatic hydrocarbons radicals containing up to 6 carbon atoms and saturated aliphatic hydrocarbon radicals containing up to 6 carbon atoms in which the carbon atoms are interrupted by a linkage chosen from the group consisting of an oxygen atom, a sulphur atom and a nitrogen atom carrying a lower alkyl substituent and X stands for a member of the group consisting of secondary aliphatic amines, piperidine and morpholine attached to L through the amino nitrogen atom, the reaction being carried out in the presence of an acid absorbing agent when Q stands for halogen.

References Cited in the file of this patent
UNITED STATES PATENTS

| | | |
|---|---|---|
| 2,328,570 | McNally et al. | Sept. 7, 1943 |
| 2,494,283 | Cassaday et al. | Jan. 10, 1950 |
| 2,506,344 | Cleary | May 2, 1950 |
| 2,566,288 | Hook et al. | Aug. 28, 1951 |
| 2,586,656 | Hook et al. | Feb. 19, 1952 |
| 2,736,726 | Gaetzi et al. | Feb. 28, 1956 |